(12) United States Patent
Lee (10) Patent No.: US 8,194,753 B2
(45) Date of Patent: Jun. 5, 2012

(54) APPARATUS PROCESSING VIDEO STREAM

(75) Inventor: Kyung-Koo Lee, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1137 days.

(21) Appl. No.: 12/036,415

(22) Filed: Feb. 25, 2008

(65) Prior Publication Data

US 2008/0205512 A1 Aug. 28, 2008

(30) Foreign Application Priority Data

Feb. 28, 2007 (KR) ........................ 10-2007-0020559

(51) Int. Cl.
*H04B 1/66* (2006.01)
*H04N 7/12* (2006.01)
*H04N 11/02* (2006.01)
*H04N 11/04* (2006.01)

(52) U.S. Cl. .............. 375/240.25; 375/240.26; 348/715; 348/716; 348/720; 348/721

(58) Field of Classification Search .............. 375/240.25–240.26; 348/715–721
See application file for complete search history.

(56) References Cited

U.S. PATENT DOCUMENTS

| | | | |
|---|---|---|---|
| 6,339,386 B1 * | 1/2002 | Cho | 341/67 |
| 6,389,033 B1 * | 5/2002 | Maxwell et al. | 370/438 |
| 6,944,226 B1 * | 9/2005 | Lin et al. | 375/240.2 |
| 7,702,218 B2 * | 4/2010 | Takahashi | 386/326 |
| 7,801,224 B1 * | 9/2010 | Vasudeva et al. | 375/240.27 |
| 2006/0114136 A1 * | 6/2006 | Chu et al. | 341/52 |
| 2008/0205512 A1 * | 8/2008 | Lee | 375/240.01 |

FOREIGN PATENT DOCUMENTS

| | | |
|---|---|---|
| KR | 100236998 B1 | 10/1999 |
| KR | 1020010004758 A | 1/2001 |
| KR | 1020030052819 A | 6/2003 |
| KR | 1020050010766 A | 1/2005 |
| KR | 1020050085273 A | 8/2005 |
| KR | 1020060004707 A | 1/2006 |

* cited by examiner

*Primary Examiner* — Kwang B Yao
*Assistant Examiner* — Benjamin H Elliott, IV
(74) *Attorney, Agent, or Firm* — Volentine & Whitt, PLLC (57) ABSTRACT

An apparatus processing a video stream includes a CPU, a memory access controller reading stream data from an external memory, a buffer storing the stream data, and a hardware accelerator decoding the stream data. The hardware accelerator includes a plurality of decoders decoding the stream data in accordance with one of a plurality of different video coding standards.

14 Claims, 7 Drawing Sheets

| Resync Marker | GOB or Slice Information | Header Information | Texture Information | Header Information | Texture Information | ... | Header Information | Texture Information | Resync Marker |

APPARATUS PROCESSING VIDEO STREAM

CROSS-REFERENCE TO RELATED APPLICATIONS

This U.S. non-provisional patent application claims priority under 35 U.S.C. §119 to Korean Patent Application No. 10-2007-0020559 filed on Feb. 28, 2007, the subject matter of which is hereby incorporated by reference.

BACKGROUND OF THE INVENTION

1. Field of the Invention

The present invention relates to an image processing apparatus and more particularly, to an apparatus for processing a video stream.

2. Description of the Related Art

Over the course of the past several decades, multiple video protocols or video coding standards for processing motion pictures, (e.g., MPEG-1, MPEG-2, MPEG-4, H.263, etc.) have been developed. Data compression/decompression techniques associated with one or more of these video coding standards have brought about some extraordinary developments in the design and use of VCD, DVD, digital TV, etc. As video capabilities have migrated into portable electronic devices such as cellular phones, for example, such devices have been forced to incorporate enabling circuitry, such as digital video coders and/or decoders (hereafter, singularly or collective referred to as "CODEC"). CODECs are indispensable to the processing of digital data signals such as the type commonly produced by the compression/decompression techniques of conventional video coding standards. Such digital data signals are required to effectively store/retrieve, display, and communicate video content.

Video content (i.e., moving pictures) is formed by a rapid succession of images, where each displayed image is formed from a plurality of video data slices. Each video data slice includes a plurality of macro data blocks, where each macro data block includes a plurality of pixels. Each slice within an image commonly includes a slice header that includes corresponding reference information.

The vast quantity of pixel data forming multiple macro data blocks which in turn form multiple slices of an image in the stream of images forming video content must necessarily be compressed (using a given video coding standard) prior to being stored in order to effectively utilize a predetermined memory space. When read from memory, a syntax accelerator analyzes the resulting video data bit stream. The analyzed bit-stream data is then processed through hardware modules such as an entropy decoder, an inverse transformer, a predictor, and a de-blocking filter, before being displayed as an image.

Bit-stream data read from the memory by the syntax accelerator contains slice data and corresponding header information. Such information includes certain physical disposition or environment information. For example, the H.264 video coding standard provides for certain environments information that includes a multiplicity of sequence and image parameter sets. The sequence parameter set may contain parameters for completing an image sequence, (e.g., identification information, a maximum number of video data frames, a sequence order of images, width and height definition for the decoded images, etc.). The picture parameter set may contain identification information, a selected sequence parameter set identification, a flag for selecting an entropy coding mode from Context Adaptive Variable Length Coding (CAVLC) and Context-based Adaptive Binary Arithmetic Coding (CABAC), and parameters defining slice groups, and parameters for prediction, quantization, and de-blocking.

Such "collateral data" is typically compressed along with "payload image data" (i.e., video pixel data that corresponds to actual image being communicated and displayed). Thus, in order to provide efficient encoding/decoding of the payload image data, it is necessary to rapidly and accurately encode/decode the corresponding stream of collateral data.

Unfortunately, as portable electronic devices, such as Personal Data Assistants (PDAs), mobile phones, and notebook computers, become smaller and lighter, it becomes increasingly difficult for such devices to incorporate multiple CODECs suitable (or optimized) for multiple video coding standards.

SUMMARY OF THE INVENTION

The present invention is directed to a video stream processing apparatus capable of encoding and decoding bit-stream data in accordance with multiple existing video coding standards. The present invention is also directed to a video stream processing apparatus capable of encoding and decoding bit-stream data in accordance with newly emerging or future video coding standards.

In one embodiment, the invention provides an apparatus processing a video stream and including; a Central Processing Unit (CPU), a memory access controller reading stream data from an external memory under the control of the CPU, a buffer storing the stream data, and a hardware accelerator decoding the stream data stored in the buffer under the control of the CPU, wherein the hardware accelerator comprises a plurality of decoders, each one of the plurality of decoders being configured to decode the stream data in accordance with a corresponding one of a plurality of different video coding standards.

DESCRIPTION OF EMBODIMENTS

Embodiments of the invention will now be described below with reference to the accompanying drawings. The present invention may, however, be embodied in different forms and should not be constructed as being limited to only the illustrated embodiments. Rather, the embodiments are presented as teaching examples. Throughout the drawings and written description, like reference numerals refer to like or similar elements.

Figure 1:
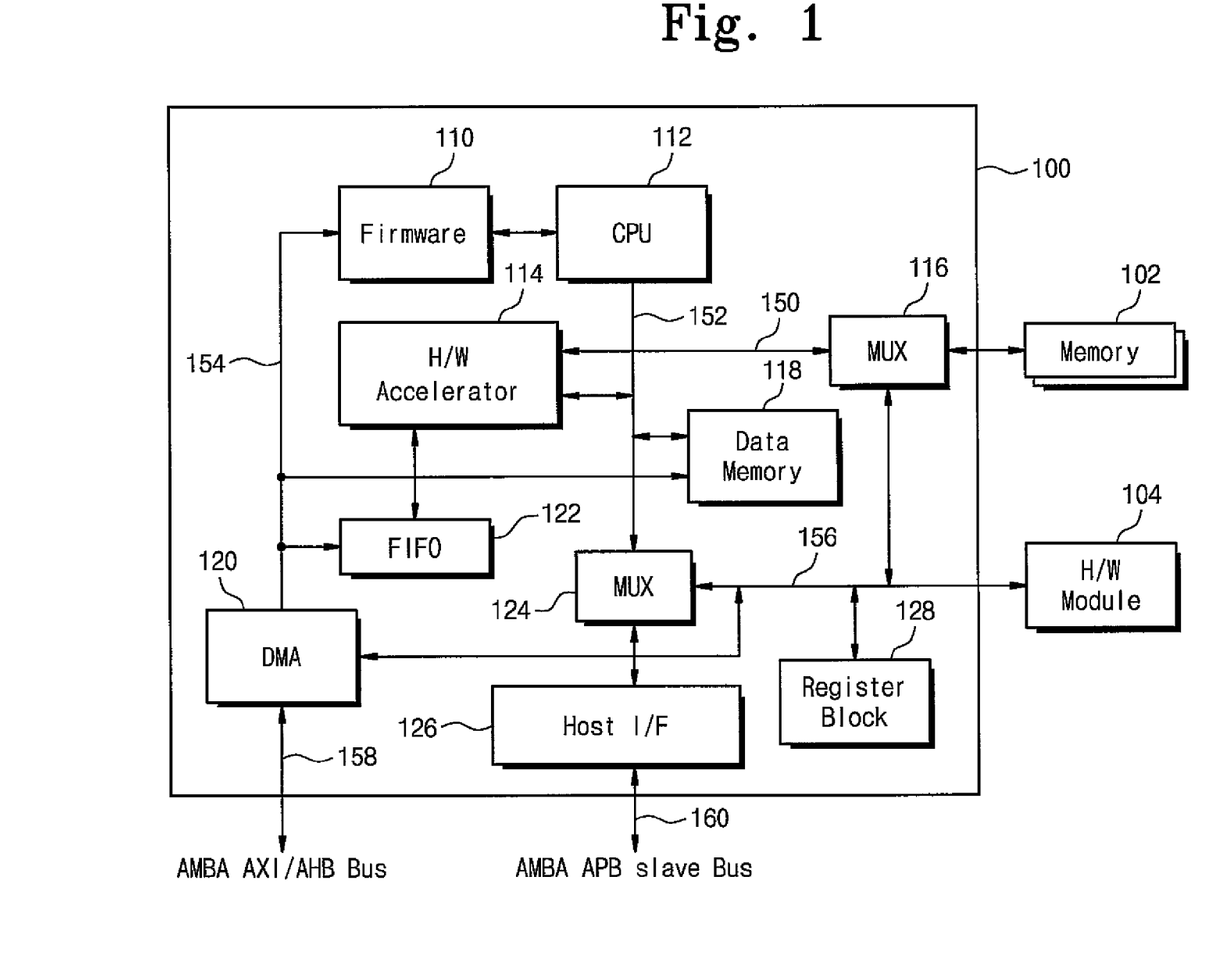
FIG. 1 is a block diagram of an apparatus for processing a video stream in accordance with an embodiment of the invention.

FIG. 1 is a block diagram of an apparatus for processing a video stream (hereinafter, referred to as video stream processing apparatus) in accordance with an embodiment of the invention.

Referring to FIG. 1, video stream processing apparatus 100 comprises a memory 110, a central processing unit (CPU) 112, a hardware (H/W) accelerator 114, multiplexers 116 and 124, a data memory 118, a direct memory access (DMA) unit 120, a host interface 126, and a register block 128.

Memory 110 may be used to store the firmware code necessary for operations of CPU 112. CPU 112 may be implemented using an Advanced RISC Machine (ARM) controlling hardware accelerator 114 and DMA unit 120. DMA unit 120 receives stream data from an external memory (not shown) by way of, for example, an Advanced Microcontroller Bus Architecture—Advanced eXensible Interface (AMBA AXI) or ARM High-performance Bus (AHB) 158 and stores the stream data into a first-in first-out (FIFO) memory 122, or in another external memory separate from FIFO memory 122.

Hardware accelerator 114 is connected to CPU 112 through ARM bus 152 and may be used to encode/decode stream data under the control of CPU 112. Encoded/decoded data output from hardware accelerator 114 may be stored in data memory 118. While video stream processing apparatus 100 of the present embodiment is described below in the context of an encoding operation facilitated by hardware accelerator 114, an analogous decoding operation might be similarly performed.

Host interface (I/F) 126 may also be connected to an external host (not shown) by way of AMBA ARM Peripheral slave Bus (AMBA APB) 160. Multiplexer 124 may be used to transfer data to an external hardware module 104 from host interface 126 and/or CPU 112 by way of an interface bus 156. Hardware module 104 may include one or more of an entropy decoder, an inverse transformer, a predictor, and a de-blocking filter.

Figure 2:
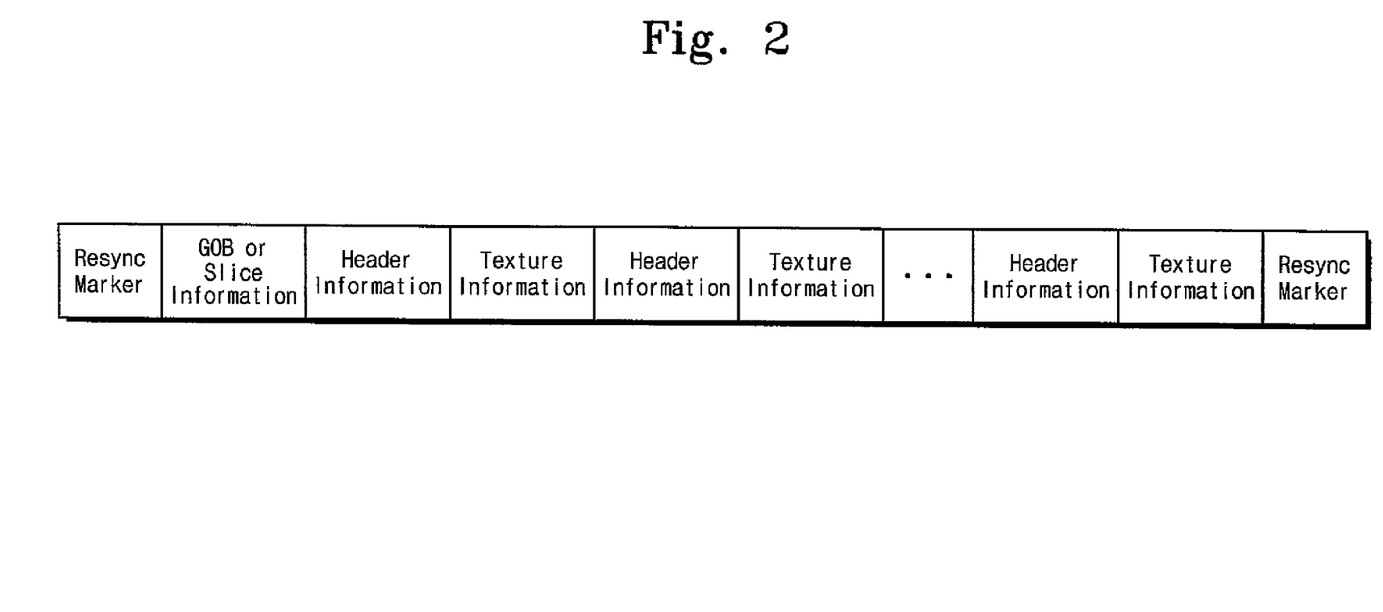
FIG. 2 shows a possible format for a video stream input received from an external memory.

FIG. 2 shows one possible format for an input video stream applied to video stream processing apparatus 100 from the external memory noted above. Of course, this is just one example of many possible formats that might be used.

Referring to FIG. 2, the video stream is formed from a Group of Block (GOB) or slice information, compressed macroblock header information, and compressed macroblock texture information between resync markers. The macroblock header information and the macroblock texture information are alternately arranged between the resync markers.

When operating in an encoding mode, video stream processing apparatus 100 outputs compressed data, header-processed data, and coefficient-processed data to the external memory. When operating in a decoding mode, video stream processing apparatus 100 reads stream data from the external memory and decodes the header and coefficient within the read stream data.

Figure 3:
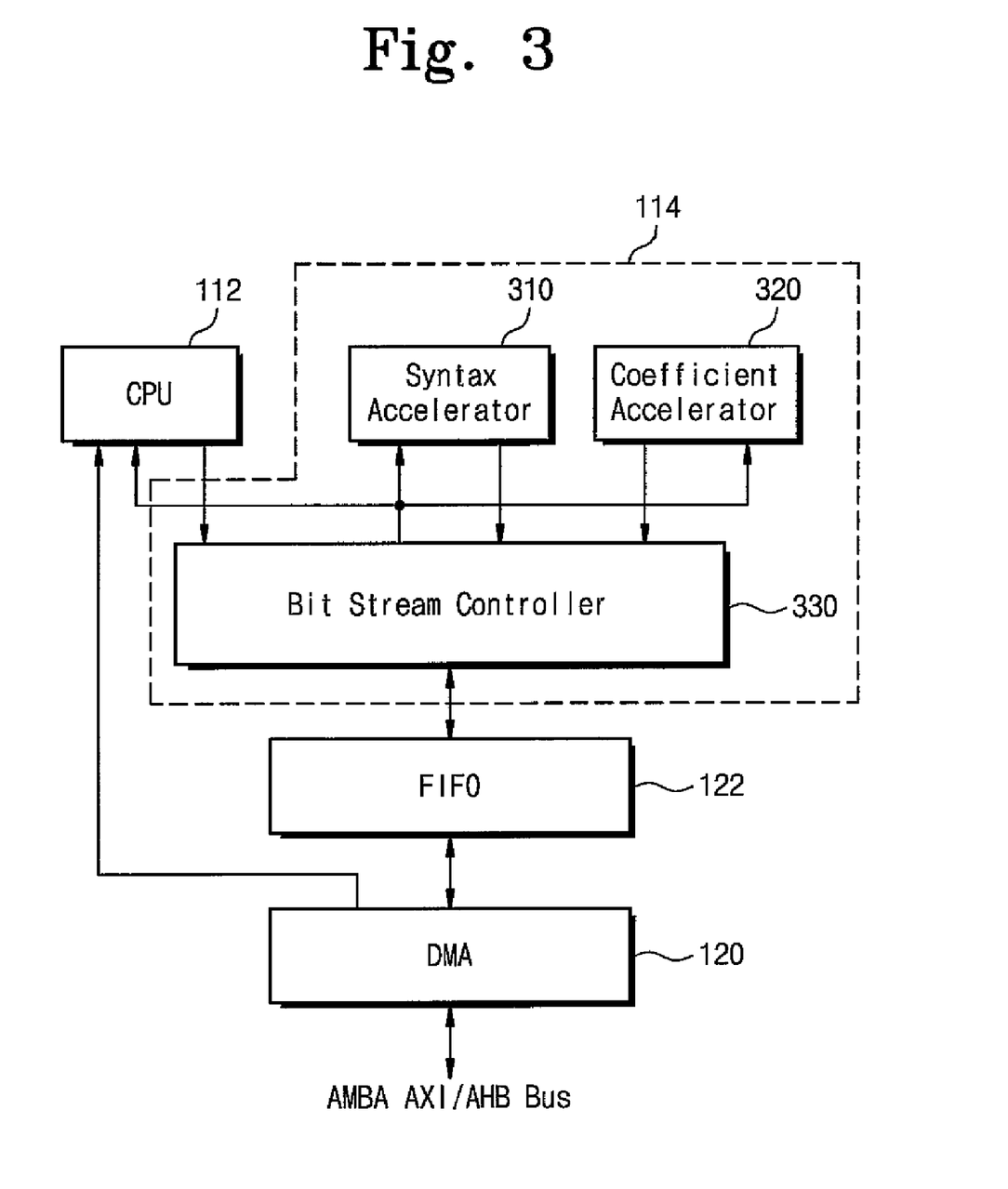
FIG. 3 is a block diagram of the hardware accelerator shown in FIG. 1.

FIG. 3 is a block diagram further illustrating hardware accelerator 114 shown in FIG. 1.

Referring to FIG. 3, hardware accelerator 114 generally comprises a syntax accelerator 310, a coefficient accelerator 320, and a bit stream controller 330.

A video stream input from the external memory is supplied to bit stream controller 330 of hardware accelerator 114 through DMA unit 120, and potentially FIFO memory 122. Bit stream controller 330 divides the received video stream into sections in a predetermined unit length and provides the sections to CPU 112, syntax accelerator 310, and coefficient accelerator 320. For instance, one possible length of bit stream output from bit stream controller 330 is 32 bits. CPU 112 receives the video stream directly from DMA unit 120, and not through hardware accelerator 114 if the current video stream need not be treated in an additional variable length decoding process.

Figure 4:
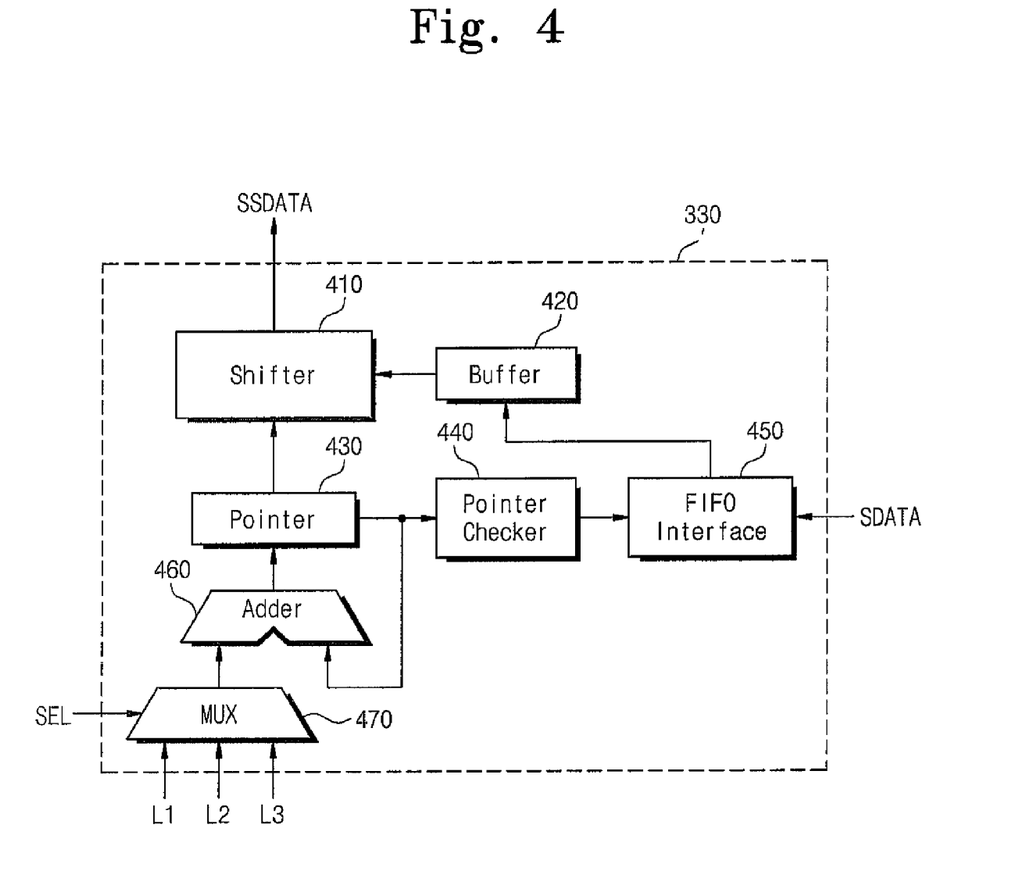
FIG. 4 is a block diagram of the bit stream controller shown in FIG. 3.

FIG. 4 is a block diagram further illustrating bit stream controller 330 shown in FIG. 3.

Referring to FIG. 4, bit stream controller 330 generally comprises a shifter 410, a buffer 420, a pointer 430, a pointer checker 440, a FIFO interface 450, an adder 460, and a multiplexer 470.

When operating in the decoding mode, FIFO interface 450 transfers stream data SDATA to buffer 420 from FIFO memory 122 shown in FIG. 3, and buffer 420 then provides the stream data to shifter 410.

Multiplexer 470 selectively inputs one of bit stream length information L1, L2, and L3 provided respectively from CPU 112, coefficient accelerator 320, and syntax accelerator 310 to adder 460 in response to a selection signal SEL generated by CPU 112. Adder 460 provides pointer 430 with a sum of outputs of multiplexer 470 and pointer 430. Pointer 430, when shifter 410 outputs a shifted stream data SSDATA from the stream data SDATA, generates a pointer value that indicates an output starting position of the shifted stream data SSDATA. Pointer checker 440 controls FIFO interface 450 in accordance with the pointer value provided from pointer 430.

Shifter 410 outputs the shifted stream data SSDATA of a predetermined size from the starting position of the stream data SDATA input through buffer 420 designated by the pointer value of pointer 430. For instance, the size of the shifted scream data SSDATA output from shifter 410 may be 4 bytes, i.e., 1 word. On the other hand, shifter 410 may be designed to remove an emulation prevention byte.

Figure 5:
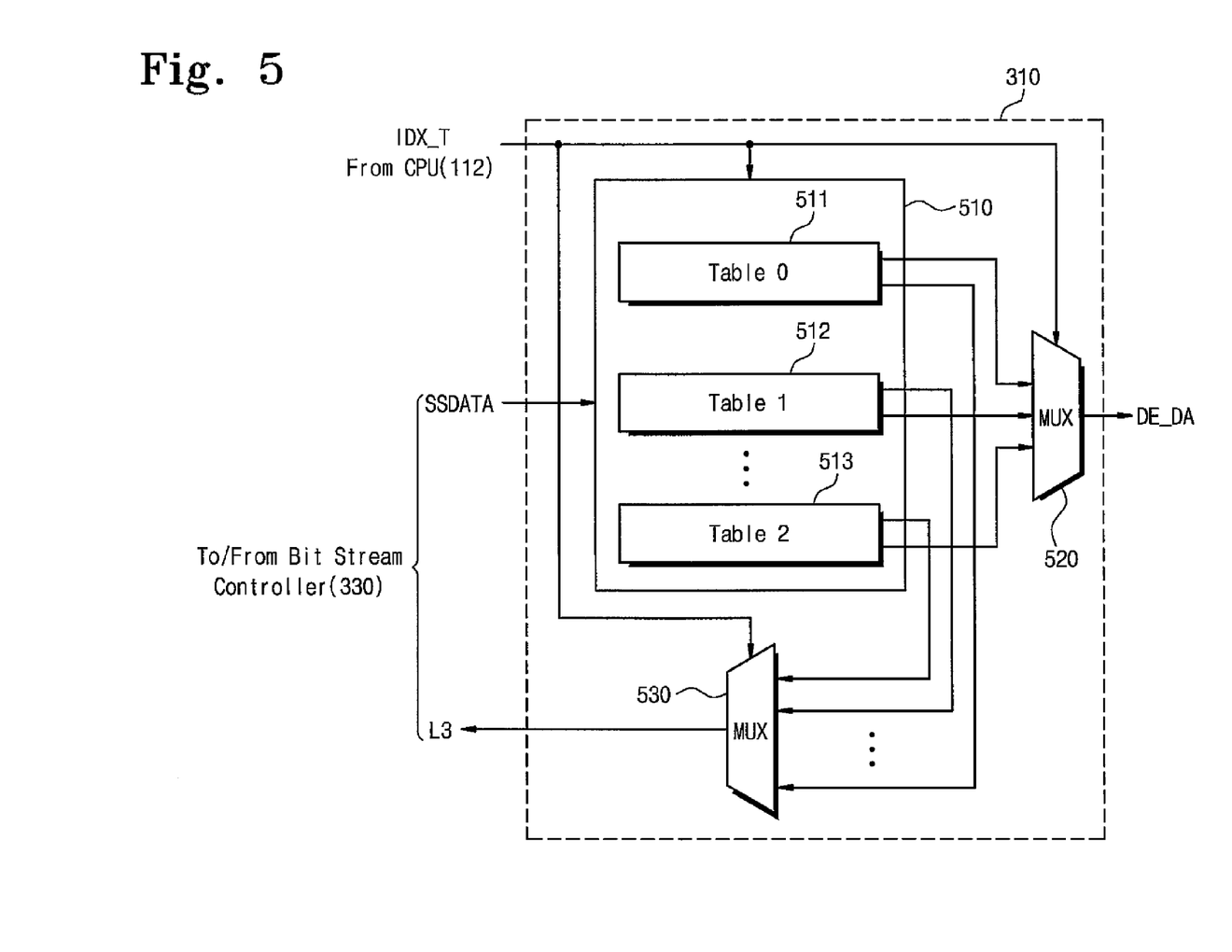
FIG. 5 is a block diagram of the syntax accelerator shown in FIG. 3.

FIG. 5 is a block diagram further illustrating syntax accelerator 310 shown in FIG. 3.

Referring to FIG. 5, syntax accelerator 310 generally comprises a decoder 310 and multiplexers 520 and 530. Decoder 510 includes a plurality of tables 511~513 corresponding each to the video coding standards such as MPEG-1, MPEG-2, MPEG-4 and H.263. Each table outputs decoded data, corresponding to the shifted stream data SSDATA input from bit stream controller 330 in response to a table index signal IDX_T provided from CPU 112.

For instance, if a current input stream data is coded in accordance with the H.264 video coding standard, the proper one of the plurality of tables 511~513 may be used to decode the shifted stream data SSDATA.

Multiplexer 520 outputs decoding data DE_DA from one of the tables 511~513 which corresponds to the table index signal IDX_T. The decoded data DE_DA is stored in data memory 118 of FIG. 1 or provided to hardware module 104. The stream length information L3 used in the decoding operation, output from the table corresponding to the table index signal IDX_T, is provided to bit stream controller 330.

Syntax accelerator 310 operates in accordance with the table index signal IDX_T. Syntax accelerator 310 is able to output decoded data in correspondence with the shifted stream data SSDATA in one cycle of a clock cycle provided each one of the plurality of tables 511~513 is implemented using logic gate circuits. Therefore, there is no clock delay inherent in the operation of syntax accelerator 310.

Figure 6:
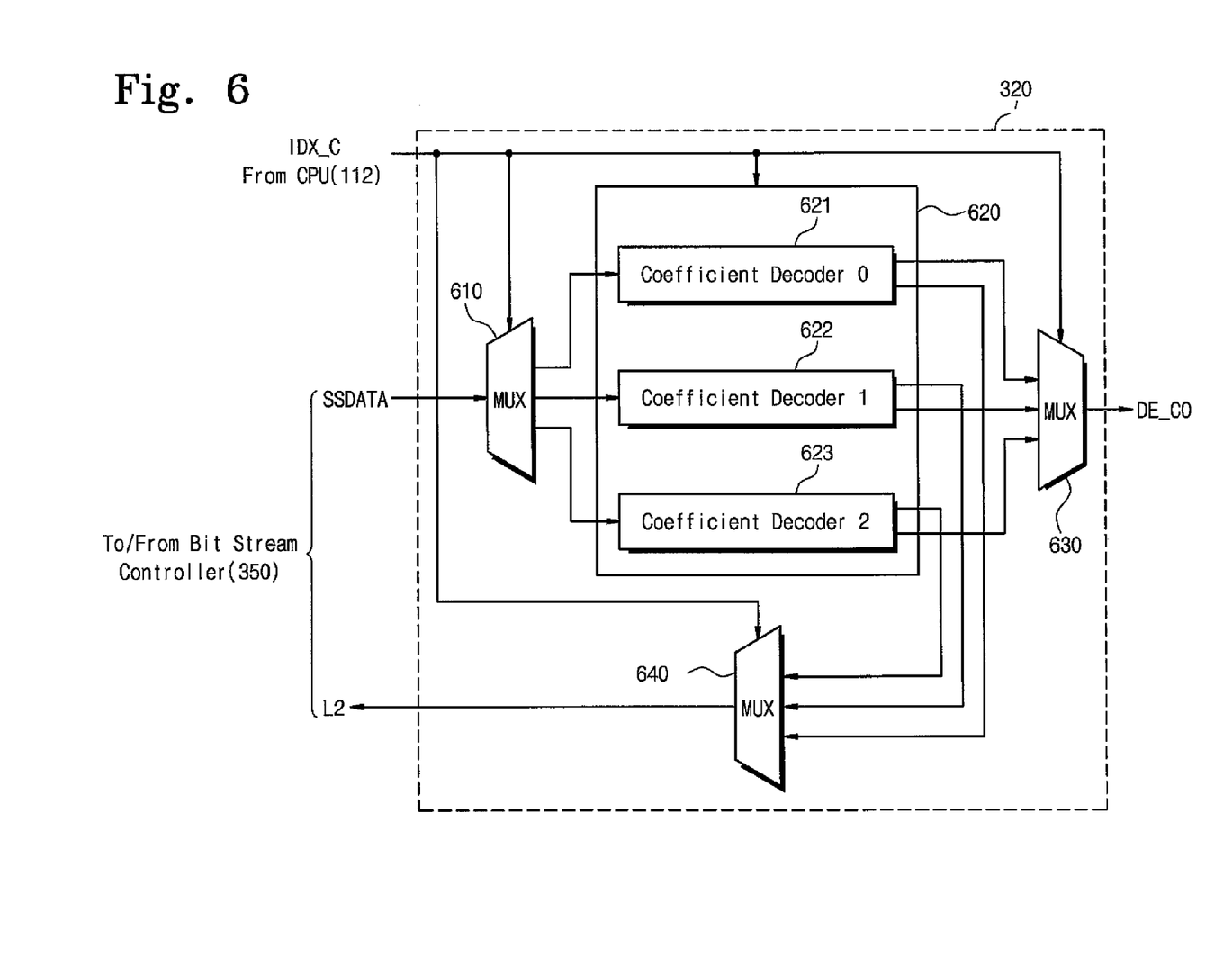
FIG. 6 is a block diagram of the coefficient accelerator shown in FIG. 3.

FIG. 6 is a block diagram further illustrating coefficient accelerator 320 shown in FIG. 3. Referring to FIG. 6, coefficient accelerator 320 generally comprises multiplexers 610, 650, and 660, and a decoder block 620. Decoder block 620 includes coefficient decoders 621~623 operating in response to a coefficient index signal IDX_C. Coefficient decoders 621~623 conduct coefficient decoding operations suitable for respective different video coding standards. As aforementioned, the video coding standards applicable to one embodiment of the invention include MPEG-1, MPEG-2, MPEG-4, and H.263.

Multiplexer 610 transfers the shifted stream data SSDATA from bit stream controller 330 into one of the coefficient decoders 621~623 in response to the coefficient index signal IDX_C provided from CPU 112.

Multiplexer 630 outputs a decoding coefficient DE_CO from one of the coefficient decoders 621~623 in response to the coefficient index signal IDX_C provided from CPU 112. The decoding coefficient DE_CO is stored in data memory 118 and may be provided to hardware module 104. Multiplexer 640 outputs the stream length information L3 from one of the coefficient decoders 621~623 in response to the coefficient index signal IDX_C provided from CPU 112. The stream length information L3 is provided to bit stream controller 330.

In one embodiment of the invention, coefficient accelerator 320 shown in FIG. 6 may also be able to process a coded video stream in accordance with an emerging or future video coding standard by adding an appropriate coefficient decoder to the foregoing configuration (i.e., to decoding block 620).

Figure 7:
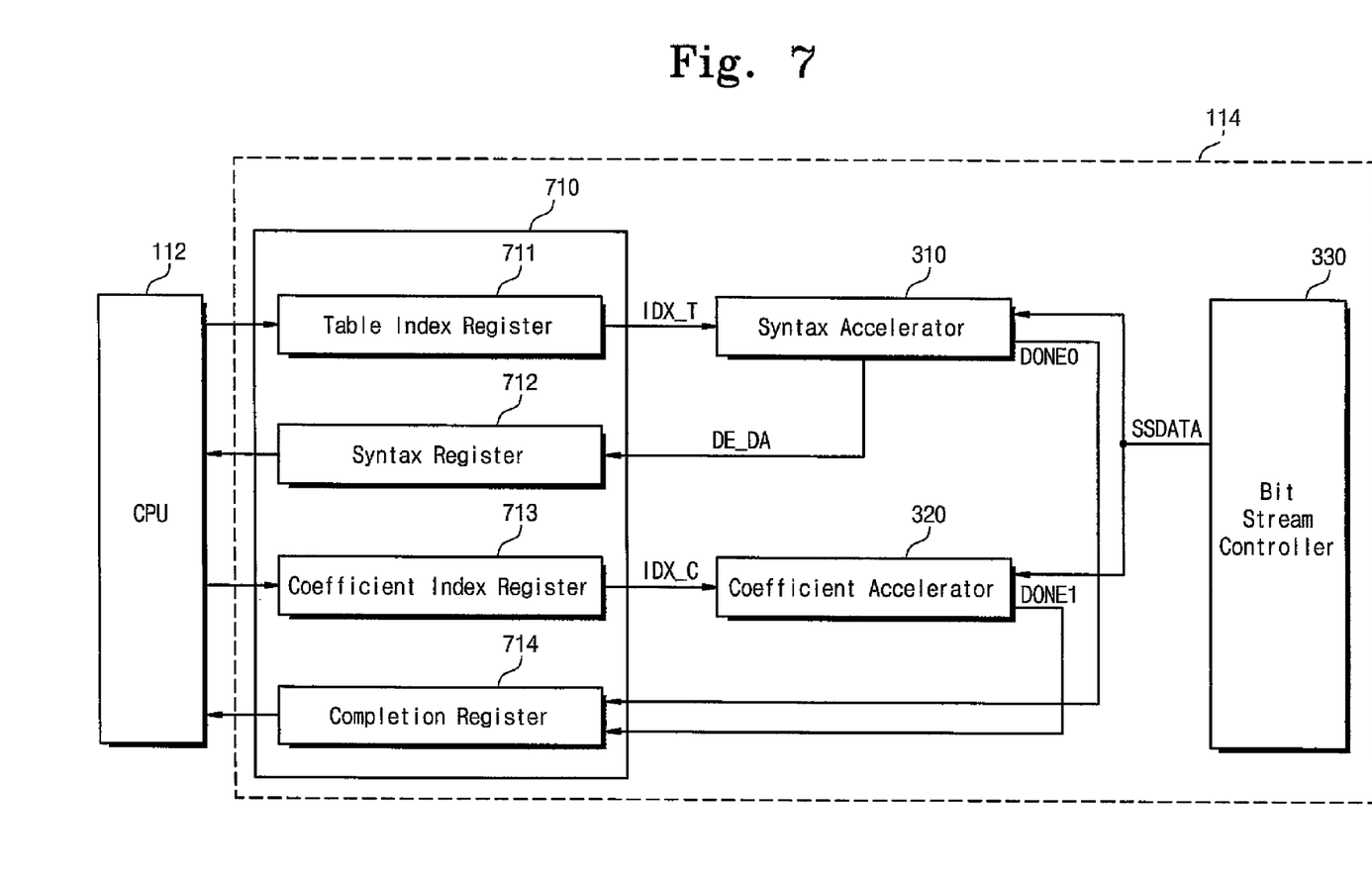
FIG. 7 is a block diagram of the hardware accelerator including a register group in accordance with an embodiment of the invention.

FIG. 7 is a block diagram of a hardware accelerator including a register group in accordance with an embodiment of the invention.

Referring to FIG. 7, hardware accelerator 114 further comprises a register group 710, as well as syntax accelerator 310, coefficient accelerator 320, and bit stream controller 330. Register group 710 includes a table index register 711, a syntax register 712, a coefficient index register 713, and a completion register 714.

Table index register 711 stores the table index signal IDX_T, received from CPU 112 and to be provided to syntax accelerator 310. Syntax register 712 stores the decoded data DE_DA output from syntax accelerator 310. The decoded data DE_DA is provided to CPU 112 from syntax register 712. Coefficient index register 713 stores the coefficient index signal IDX_C, received from CPU 112 and to be provided to coefficient accelerator 310. Completion register 714 stores a completion signal DONE0 received from syntax accelerator 714 and a completion signal DONE1 received from coefficient accelerator 320. The completion signals DONE0 and DONE1 stored in register 714 are transferred to CPU 112.

According to the aforementioned, the video stream processing apparatus according to various embodiments of the invention are able to encode/decode stream data in accordance with various video coding standards. Moreover, the video stream processing apparatus according to the present invention may be altered to be compatible with any emerging or future video coding standard by simply providing the hardware accelerator with a decoding table and coefficient decoder suitable for a new video coding standard.

The above-disclosed subject matter is to be considered illustrative, and not restrictive, and the appended claims are intended to cover all such modifications, enhancements, and other embodiments, which fall within the scope of the invention. Thus, to the maximum extent allowed by law, the scope of the invention is to be determined by the broadest permissible interpretation of the following claims and their equivalents.

What is claimed is:

1. An apparatus for processing a video stream, comprising:
a Central Processing Unit (CPU);
a memory access controller reading stream data from an external memory under the control of the CPU;
a buffer storing the stream data; and
a hardware accelerator decoding the stream data stored in the buffer under the control of the CPU,
wherein the hardware accelerator comprises:
a plurality of decoders, each one of the plurality of decoders being configured to decode the stream data in accordance with a corresponding one of a plurality of different video coding standards, and
a stream controller receiving the stream data from the buffer and providing shifted stream data having a predetermined size in response to a bit stream length indicated by the CPU and stream length information.

2. The apparatus of claim 1, wherein the CPU outputs a first selection signal to select one of the plurality of decoders.

3. The apparatus of claim 2, wherein the hardware accelerator comprises a first selector outputting decoded stream data from the selected one of the plurality of decoders in response to the first selection signal.

4. The apparatus of claim 3, wherein the hardware accelerator further comprises a first register storing the first selection signal.

5. The apparatus of claim 3, wherein the hardware accelerator further comprises a first output circuit providing stream length information to the selected one of the plurality of decoders in response to the first selection signal.

6. The apparatus of claim 5, wherein the hardware accelerator further comprises a coefficient accelerator decoding a coefficient associated with the stream data.

7. The apparatus of claim 6, wherein the coefficient accelerator comprises a plurality of coefficient decoders, each one of the plurality of coefficient decoders being configured to decode the stream data in accordance with a corresponding one of a plurality of different video coding standards.

8. The apparatus of claim 7, wherein the CPU outputs a second selection signal selecting one of the plurality of coefficient decoders.

9. The apparatus of claim 8, wherein the hardware accelerator further comprises a second selector outputting a decoded coefficient from the selected one of the plurality of coefficient decoders in response to the second selection signal.

10. The apparatus of claim 9, wherein the hardware accelerator further comprises a second register storing the second selection signal.

11. The apparatus of claim 10, wherein the hardware accelerator further comprises a second output circuit providing stream length information to the selected one of the plurality of coefficient decoders in response to the second selection signal.

12. An apparatus for processing a video stream, comprising:
a Central Processing Unit (CPU);
a memory access controller reading stream data from an external memory under the control of the CPU;
a buffer storing the stream data; and
a hardware accelerator decoding the stream data stored in the buffer under the control of the CPU,
wherein the hardware accelerator comprises a plurality of decoders, each one of the plurality of decoders being configured to decode the stream data in accordance with a corresponding one of a plurality of different video coding standards,
wherein the CPU outputs a first selection signal to select one of the plurality of decoders,
wherein the hardware accelerator comprises a first selector outputting decoded stream data from the selected one of the plurality of decoders in response to the first selection signal, wherein the hardware accelerator further comprises a first output circuit providing stream length information to the selected one of the plurality of decoders in response to the first selection signal, wherein the hardware accelerator further comprises a coefficient accelerator decoding a coefficient associated with the stream data, wherein the coefficient accelerator comprises a plurality of coefficient decoders, each one of the plurality of coefficient decoders being configured to decode the stream data in accordance with a corresponding one of a plurality of different video coding standards, wherein the CPU outputs a second selection signal selecting one of the plurality of coefficient decoders, wherein the hardware accelerator further comprises a second selector outputting a decoded coefficient from the selected one of the plurality of coefficient decoders in response to the second selection signal, wherein the hardware accelerator further comprises a second register storing the second selection signal, wherein the hardware accelerator further comprises a second output circuit providing stream length information to the selected one of the plurality of coefficient decoders in response to the second selection signal, and wherein the hardware accelerator further comprises a stream controller receiving the stream data from the buffer and providing shifted stream data having a predetermined size in response to a bit stream length indicated by the CPU and stream length information provided from at least one of the first and second output circuits.

13. The apparatus of claim 12, wherein the shifted stream data is provided to the CPU, the plurality of decoders, and the plurality of coefficient decoders.

14. The apparatus of claim 1, further comprising a firmware memory storing firmware code for the CPU.

* * * * *